(12) United States Patent
Tinker et al.

(10) Patent No.: US 10,900,778 B2
(45) Date of Patent: Jan. 26, 2021

(54) SYSTEMS AND METHODS FOR IMPLEMENT POSITION MEASUREMENT

(71) Applicant: Caterpillar Inc., Deerfield, IL (US)

(72) Inventors: Matthew M. Tinker, Peoria, IL (US); Jeffrey K. Berry, Yorkville, IL (US); Austin J. Scott, Naperville, IL (US); Aaron R. Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 247 days.

(21) Appl. No.: 16/109,274

(22) Filed: Aug. 22, 2018

(65) Prior Publication Data

US 2020/0064130 A1    Feb. 27, 2020

(51) Int. Cl.
*G01B 21/16* (2006.01)
*G01C 1/00* (2006.01)

(52) U.S. Cl.
CPC ............... *G01B 21/16* (2013.01); *G01C 1/00* (2013.01)

(58) Field of Classification Search
CPC .................................. G01B 21/16; G01C 1/00
See application file for complete search history.

(56) References Cited

U.S. PATENT DOCUMENTS

| | | | |
|---|---|---|---|
| 9,347,205 B2 | 5/2016 | Kosarev et al. | |
| 9,435,101 B2 | 9/2016 | Zhdanov et al. | |
| 9,567,731 B2 | 2/2017 | Darukhanavala et al. | |
| 2007/0088477 A1* | 4/2007 | Brewer | G01C 21/16 701/41 |
| 2012/0022780 A1* | 1/2012 | Kulik | G01C 25/00 701/498 |
| 2012/0053834 A1* | 3/2012 | Loomis | G01S 19/47 701/510 |
| 2014/0136048 A1* | 5/2014 | Ummethala | G01P 21/00 701/33.1 |
| 2014/0207331 A1* | 7/2014 | Kosarev | E02F 9/264 701/34.4 |
| 2015/0088419 A1* | 3/2015 | Bhardwaj | G01C 21/20 701/472 |
| 2015/0268042 A1* | 9/2015 | Fehr | G01S 19/13 702/150 |
| 2017/0107700 A1* | 4/2017 | Faivre | E02F 9/265 |
| 2017/0146667 A1* | 5/2017 | Medagoda | G01C 21/16 |
| 2017/0254049 A1* | 9/2017 | Kean | E02F 3/3604 |
| 2019/0100205 A1* | 4/2019 | Kean | B60W 30/18009 |

* cited by examiner

*Primary Examiner* — Raymond L Nimox
(74) *Attorney, Agent, or Firm* — Bookoff McAndrews

(57) ABSTRACT

A method for retrofitting a plurality of position sensors on a machine includes installing the plurality of position sensors on the machine, wherein the position sensors include at least two inertial measurement units (IMUs). The method further includes calibrating orientation of the IMUs, obtaining measurements from the IMUs, determining relative differences between the measurements obtained from the IMUs, and processing the relative differences using a Kalman filter procedure to determine positional data of the machine.

20 Claims, 3 Drawing Sheets

SYSTEMS AND METHODS FOR IMPLEMENT POSITION MEASUREMENT

TECHNICAL FIELD

The present disclosure relates generally to systems and methods for measuring the relative position between the body of a vehicle and an implement coupled to the body.

BACKGROUND

Measurement of the linkage angle of an implement coupled to the body of a vehicle is essential for controlling and analytical tracking of the operation of the vehicle. Currently, many vehicles use rotary position sensors as linkage angle sensors. However, compared to rotary position sensors, inertial measurement unit (IMU) sensors are more flexible and accurate in sensing the linkage angle of the implement. Thus, there is a need for methods and systems for installing IMU sensors or retrofitting existing linkage angle sensors on vehicles by replacing them with IMU sensors to improve the linkage angle measurements of the implements.

U.S. Pat. No. 9,347,205 ('205 patent) discloses methods and systems for estimating the relative attitude and position between a vehicle body and an implement. The methods and systems in the '205 patent measure the linkage angle positon of the implement based on measurements obtained from two IMUs on the vehicle. However, the '205 patent fails to disclose any methods or systems for retrofitting linkage angle sensors. The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

A method for retrofitting a plurality of position sensors on a machine includes installing the plurality of position sensors on the machine, wherein the position sensors include at least two inertial measurement units (IMUs). The method further includes calibrating orientation of the IMUs, obtaining measurements from the IMUs, determining relative differences between the measurements obtained from the IMUs, and processing the relative differences using a Kalman filter procedure to determine positional data of the machine.

In another aspect, a method for determining a relative position between an implement and a body of a machine includes obtaining a first measurement from a first inertial measurement unit (IMU) on a chassis of the machine, a second measurement of a second IMU on a tilt lever of the machine, and a third measurement from a third IMU on a lift arm of the machine. The method further includes determining relative differences between the first measurement and the second measurement, between the first measurement and the third measurement, and/or between the second measurement and the third measurement, and processing the relative differences using a Kalman filter procedure, thereby calculating the relative position based on the processed relative differences.

In yet another aspect, a system for determining a relative position between an implement and a body of a machine includes a controller configured to obtain a first measurement from a first IMU on the machine and a second measurement from a second IMU on the machine, wherein the first measurement includes a first acceleration, a first angular velocity, and a first gravity-based pitch angle, and the second measurement includes a second acceleration, a second angular velocity, and a second gravity-based pitch angle. The controller is further configured to determine a relative difference between the first measurement and the second measurement, and process the relative difference using a Kalman filter procedure, thereby calculating the relative position based on the processed relative differences.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Figure 1:
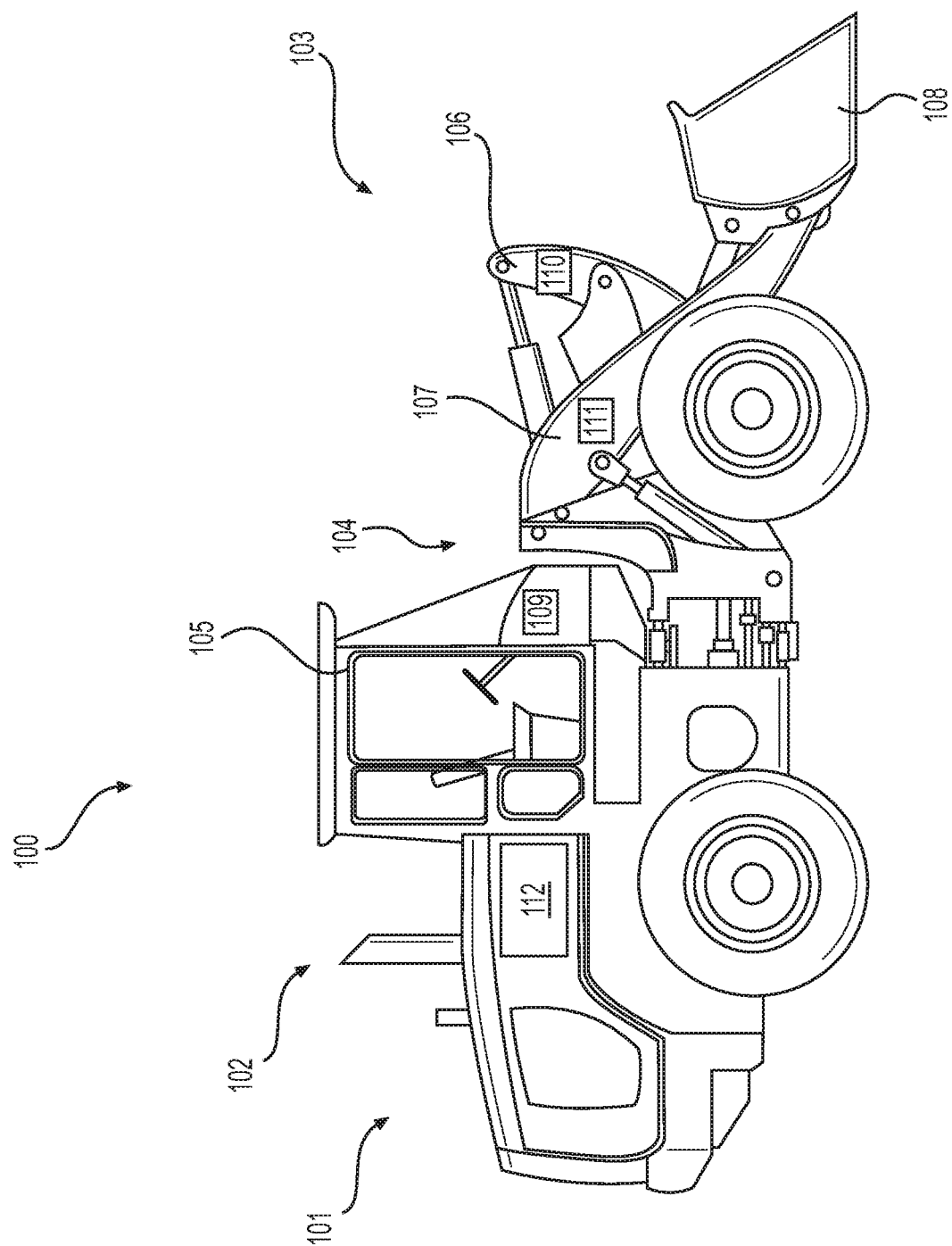
FIG. 1 is a schematic representation of an exemplary system for measuring the relative position between the body of a vehicle and an implement coupled to the body.

FIG. 1 illustrates an exemplary system 100 for measuring a relative position (e.g., a linkage angle) between a body 102 and an implement system 103 of a machine 101. The system 100 may include one or more components of the machine 101, a position sensor system 104, and a controller 112. The machine 101 may be a mobile machine, for example, a wheel loader as shown in FIG. 1, or may be any other industrial mobile machines using an implement system 103, such as, for example, a backhoe loader, dozer, skid steer loader, excavator, etc. Further, while a loader-type bucket implement system 103 is shown in FIG. 1, other implement systems may be used, such as implement systems including a blade, auger, fork, grapple, hammer, shear, plow, etc. Implement system 103 of the machine 101 may include a tilt lever 106, a lift arm 107, and a bucket 108, and hydraulic or pneumatic actuators to control the position of the implement system 103. The implement system 103 may also be operatively coupled with a chassis 105 of the machine 101. The relative position of the machine body 102 and the implement system 103 may be measured during normal or intended operation of the machine 101. For example, the relative position may be measured when the machine 101 is mobile traveling on roads or ground surfaces, or engaging a ground surface for treatment.

The machine 101 may include any appropriate and conventional control systems including operator interfaces, and electronic components. For example, the machine 101 may include appropriate electronic processors/controllers (e.g., controller 112), sensors, memory, communications systems, and/or user interfaces.

The position sensor system 104 of the machine 101 may include one or more inertial measurement units (IMUs). An IMU may include one or more accelerometers and one or more gyroscopes. The position sensor system 104 may include a plurality of (e.g., 2, 3, 4, 5, or more) IMUs. When there are a plurality of IMUs, the IMUs may be on different parts of the machine 101. For example, the system 100 may include an IMU 109 on the chassis 105, an IMU 110 on the tilt lever 106, and an IMU 111 on the lift arm 107. The IMU 111 may be on a part of the lift arm 107 close to the chassis 105, or a part of the lift arm 107 close to the bucket 108. In another example, an IMU (e.g., IMU 110 or IMU 111) may be on the bucket 108.

The controller 112 may be configured to receive, analyze, and/or store measurements obtained from the position sensor system 104. The measurements made by the position sensor system 104 may be transmitted to the controller 112 via a wireless network, which may allow for the elimination of the cables connecting the position sensor system 104 and the machine 101. This configuration may allow more flexibility for installing the linkage angle sensor on the machine 101.

The controller 112 may include any appropriate hardware and software, e.g., one or more processors, memory, communication systems, and/or other appropriate hardware. The processors may be, for example, a single- or multi-core processor, a digital signal processor, microcontroller, a general-purpose central processing unit (CPU), and/or other conventional processor or processing/controlling circuit or controller. The memory may include, for example, read-only memory (ROM), random access memory (RAM), non-volatile random access memory (NVRAM), flash or other removable memory, or any other appropriate and conventional memory. In one example, the controller 112 includes an NVRAM.

Figure 2A:
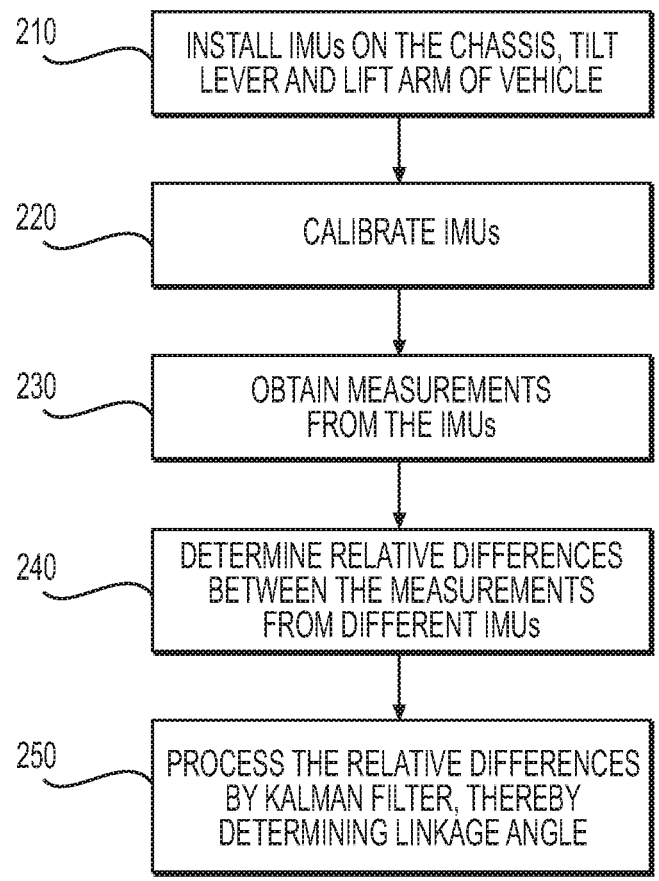
FIG. 2A is a flow chart that illustrates an exemplary method for measuring the relative position between the body of a vehicle and an implement coupled to the body.
Figure 2B:
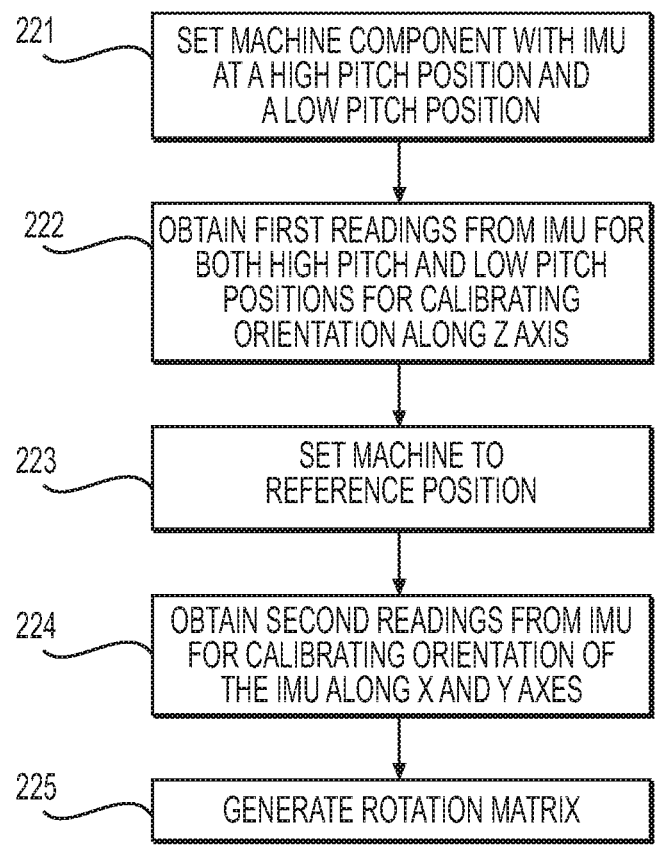
FIG. 2B is a flow chart that illustrates an exemplary method for calibrating the orientation of IMUs installed on a vehicle.

The software associated with the components of the system 100 may include any appropriate software, programs, and/or applications for providing the functions provided in this disclosure (e.g., the functions of FIGS. 2A and 2B). Such software may be stored on the controller 112 or at another location on the machine 101, or may be stored remotely from the machine 101 and accessible from the machine 101. The components of the system 100 may further include one or more data storage devices storing instructions for performing the methods herein, a non-transitory computer readable medium for use on a computer system containing computer-executable programing instructions for performing the methods herein, and/or a processor configured to execute the instructions.

FIG. 2A is a flow chart that illustrates an exemplary method 200 for retrofitting the position sensor system 104 to the machine 101 for measuring the relative position between the body 102 and the implement system 103 of the machine 101. The method may include an orientation calibration process, which allows for installing sensors of the position sensor system 104 on any location on the machine 101 in any orientation. Retrofitting the position sensor system 104 may include replacing an existing position sensor (e.g., a rotary sensor) on the machine 101 with the position sensor system 104. In some cases, retrofitting the position sensor system 104 may include installing the position sensor system 104 to the machine 101 without removing any existing position sensor. The method may allow for improving the measurement of the relative position between the machine body 102 and the implement system 103 with the position sensor system 104 sold after the machine 101 is manufactured. The method may be performed by the system 100 illustrated in FIG. 1.

Step 210 may include installing one or more IMUs of the position sensor system 104 on the machine 101. The IMUs may be installed on any component or part of the machine 101. The IMUs may be installed in any orientation and at any convenient location on the machine 101. For example, one or more of the IMUs do not need to be aligned with the linage motion of the implement system 103. In some cases, step 210 may include installing a first IMU on the body 102 and one or more IMUs on the implement system 103. For example, this step may include installing the IMU 109 on the chassis 105, the IMU 110 on the tilt lever 106, and the IMU 111 on the lift arm 107. In some cases, the step may include installing IMU 110 or IMU 111 on the bucket 108.

As mentioned above, in some cases the IMUs may replace an existing sensor on the machine 101. In these cases, the method 200 may further include, prior to step 210, removing or disabling the existing sensor from the machine 101. The existing sensor may be any type of position sensors. For example, the existing sensor may be a rotary sensor. Alternatively or additionally, the existing sensor may be a sensor containing an IMU. The existing sensor may be on the machine 101 when the machine 101 is manufactured.

Step 220 may include calibrating the orientation of the IMUs installed on the machine 101. The calibration may include calculating the position of three orthogonal axes defining the orientation of the IMUs, calibrating a lift offset, calibrating a tilt offset, calibrating angular velocity zeros, or any combinations thereof. The calibration may include generating an orientation rotation matrix, which can be used for transforming the IMU readings (e.g., accelerations and/or angular velocities) into calibrated values.

FIG. 2B shows an exemplary method for performing the calibration described in step 220. For example, the method may be used for calibrating the orientations along three orthogonal axes (x, y, and z axes) for each IMU 109-111. Step 221 may include setting or positioning machine 101's IMU components at a high pitch position and a low pitch position. The high pitch and low pitch positions may correspond to the extremes of movement of the component that is associated with the IMU. For example, an IMU 111 associated with a lift arm may have a high pitch position corresponding to a highest operational position of the lift arm, and a low pitch corresponding to a lowest operational position of the lift arm. As noted above, the IMUs may be associated with the chassis, the lift arm, the tilt lever, or the bucket of the machine 101.

Step 222 may include obtaining first positional readings from the IMU for both the high pitch and the low pitch positions for calibrating the IMU's orientation along the z axis (e.g., rotation axis). Step 223 may include setting or positioning the machine 101 to a reference position. The reference position can be any position of the machine, as long as the position of the IMU(s) are known (obtained or measured by other means than the IMU(s)). Step 224 may include obtaining second readings from the IMU at the reference position for calibrating the IMU's orientation along the x axis and the y axis. Step 225 may include generating an orientation rotation matrix using the first and second readings and the known position at the reference position.

Referring back to FIG. 2A, step 230 may include obtaining measurements from the IMUs. The measurements may include accelerations, angular velocities, gravity-based angles, such as pitch or roll angles, or any combinations thereof. The measurements may be transformed to calibrated values using the orientation rotation matrix generated in step 220. The measurements may be made by the IMUs and transmitted to the controller 112 for further analysis. In some cases, the measurements may be performed when the machine 101 is mobile, traveling on roads or ground surfaces, or engaging a ground surface for treatment, e.g., when the machine 101 is accelerating and/or the linage position is changing.

Step 240 may include determining relative differences between the measurements obtained from different IMUs. In this step, IMU readings/positional data common to the compared IMUs can be zeroed-out so that only the positional data individually associated with each IMU and isolated from common movement is identified for determining the respective component positions. For example, if positional data is obtained during driving movement of the machine 101, the driving movement of the machine would be common between all of the IMUs 109-111, and thus the driving movement data would be zeroed-out for all of the IMUs 109-111 so that only isolated, individual IMU positional data remains (without the driving movement).

Step 250 may include processing the relative differences data from the IMUs. The processing may be performed using a Kalman filter procedure. The Kalman filter may combine the relative differences, e.g., relative angular velocities and relative accelerations, by monitoring signal behavior. The Kalman filter may reduce the noise and/or the drift of the measurements and relative differences. For example, the Kalman filter may take the positional data (e.g., angle data from the accelerometer of a respective IMU, and integrated gyroscope data from the IMU), and process the data through the Kalman filter to obtain a Kalman filter result. Step 250 may further include determining the linkage angle or chassis angle of machine 101 based on the Kalman filter results.

The method 200 may be used in calculating the position of any component of the implement, such as the bucket angle. The method 200 may also be used in tracking the performance of the machine 101, such as calculating the payload of the machine 101.

INDUSTRIAL APPLICABILITY

The present disclosure finds potential application in measuring the relative position between a body of a machine and an implement coupled to it. The present disclosure also has potential application in retrofitting position sensors on a machine for more accurate control of the operation of the machine. The methods and systems herein enable installing IMUs on any location of the machine in any orientation. Alternatively or additionally, the methods and systems enable replacing an existing sensor system, e.g., a rotary sensor system, with a position sensor system with multiple IMUs. The orientation of the IMUs may be calibrated so that the IMUs may be installed on any appropriate part or location on the machine. This provides flexibility for the retrofitting process.

For example, the present disclosure includes a method for installing one or more position sensors on a machine 101. In such an example, a new position sensor system 104 with three IMUs (109, 110, and 111) is installed on the machine 101. The orientation of the IMUs is calibrated and an orientation rotation matrix is generated in the calibration process. Measurements such as accelerations, angular velocities, and/or gravity-based pitch or roll angles are obtained from the IMUs. The measurements are transformed into calibrated values using the orientation rotation matrix. The relative differences between the measurements or the calibrated measurements from different IMUs are determined. For example, the relative differences between the accelerations measured by the IMU 111 and the accelerations measured by the IMU 109 or IMU 110 are determined. In another example, the relative difference between the angular velocities measured by the IMU 107 and the angular velocities measured by the IMU 109 or IMU 110 are determined. The relative differences may be processed by a Kalman filter procedure, which may reduce the noise and improve the accuracy of the relative differences. The relative position (e.g., linkage angle) between the machine body 102 and the implement system 103 is then determined based on the Kalman filter results.

It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A method for retrofitting a plurality of position sensors on a machine, the method comprising:
   a. installing the plurality of position sensors on the machine, wherein the position sensors include at least two inertial measurement units (IMUs), including a first IMU positioned on a member of an implement system of the machine;
   b. calibrating orientation of the IMUs, including actuating the member of the implement system between a pair of positions;
   c. obtaining measurements from the IMUs;
   d. determining relative differences between the measurements obtained from the IMUs; and
   e. processing the relative differences using a Kalman filter procedure to determine positional data of the machine.

2. The method of claim 1, wherein the machine is a mobile machine including the implement system.

3. The method of claim 2, wherein at least one IMU is not aligned with a linkage motion of the implement system of the machine.

4. The method of claim 1, wherein the plurality of position sensors includes three IMUs.

5. The method of claim 1, wherein the positional data includes accelerations, angular velocities, gravity-based pitch or roll angles, or a combination thereof.

6. The method of claim 1, wherein the positional data is obtained during movement of the machine.

7. The method of claim 1, wherein calibrating the orientation of the IMUs includes generating an orientation rotation matrix.

8. The method of claim 7, wherein the positional data includes determining relative differences between the measurements from different IMUs.

9. The method of claim 1, wherein calibrating the orientation of the IMUs includes generating an orientation rotation matrix.

10. The method of claim 1, wherein the machine is a wheel loader.

11. A method for determining a relative position between an implement and a body of a machine, the method comprising:

a. placing a first inertial measurement unit (IMU) on a chassis of the machine, a second IMU on a tilt lever of the machine, and a third IMU on a lift arm of the machine;
b. calibrating orientation of the first IMU, the second IMU, and the third IMU, including actuating an implement system;
c. obtaining a first measurement from the first IMU, a second measurement from the second IMU, and a third measurement from the third IMU;
d. determining relative differences between the first measurement and the second measurement, between the first measurement and the third measurement, and/or between the second measurement and the third measurement; and
e. a processing the relative differences using a Kalman filter procedure, thereby calculating the relative position based on the processed relative differences.

12. The method of claim 11, wherein the machine is in motion during the obtaining, the determining, and the processing.

13. The method of claim 11, further comprising calculating a bucket angle.

14. The method of claim 11, further comprising using the relative position in calculating a payload of the machine.

15. The method of claim 11, wherein the first measurement, the second measurement, and the third measurement are a first acceleration, a second acceleration, and a third acceleration.

16. The method of claim 11, wherein the first measurement, the second measurement, and the third measurement are a first angular velocity, a second angular velocity, and a third angular velocity.

17. The method of claim 11, wherein the first measurement, the second measurement, and the third measurement are a first gravity-based pitch angle, a second gravity-based pitch or roll angle, and a third gravity-based pitch angle.

18. The method of claim 11, wherein the relative differences include a first relative difference between the first measurement and the third measurement, and a second relative difference between the second measurement and the third measurement.

19. A system for determining a relative position between an implement and a body of a machine, the system comprising:
   a first inertial measurement unit ("IMU") on a chassis of the machine;
   a second IMU on a member of an implement system of the machine; and
   a controller configured to:
   a. calibrate orientation of the IMUs, including actuating the member of the implement system between a pair of positions;
   b. obtain a first measurement from the first IMU and a second measurement from the second IMU, wherein the first measurement includes a first acceleration, a first angular velocity, and a first gravity-based pitch angle, and the second measurement includes a second acceleration, a second angular velocity, and a second gravity-based pitch angle;
   c. determine a relative difference between the first measurement and the second measurement; and
   d. process the relative difference using a Kalman filter procedure, thereby calculating the relative position based on the processed relative differences.

20. The method of claim 1, wherein the pair of positions correspond to maximum and minimum operational positions of the member of the implement system.

* * * * *